United States Patent [19]

Wu et al.

[11] Patent Number: 5,758,076

[45] Date of Patent: May 26, 1998

[54] MULTIMEDIA SERVER SYSTEM HAVING RATE ADJUSTABLE DATA RETRIEVAL BASED ON BUFFER CAPACITY

[75] Inventors: Kun-Lung Wu, Yorktown Heights; Philip Shi-Lung Yu, Chappagua, both of N.Y.

[73] Assignee: International Business Machines Corporation, Armonk, N.Y.

[21] Appl. No.: 504,268

[22] Filed: Jul. 19, 1995

[51] Int. Cl.[6] .................................................. G06F 13/00
[52] U.S. Cl. .............................. 395/200.13; 395/200.01
[58] Field of Search .............................. 395/800, 200.13, 395/200.01; 370/4 R

[56] References Cited

U.S. PATENT DOCUMENTS

| | | | |
|---|---|---|---|
| 4,991,032 | 2/1991 | Staffer | 360/14.3 |
| 5,291,468 | 3/1994 | Carmon | 369/47 |
| 5,463,620 | 10/1995 | Siram | 370/60 |
| 5,508,733 | 4/1996 | Kassatly | 348/13 |
| 5,532,937 | 7/1996 | Gratiano | 364/514 C |
| 5,550,982 | 8/1996 | Long | 395/200.13 |
| 5,557,724 | 9/1996 | Sampat | 395/157 |
| 5,583,561 | 12/1996 | Baker | 395/200.09 |
| 5,583,652 | 12/1996 | Ware | 386/75 |
| 5,586,264 | 12/1996 | Belkaap | 395/200.08 |
| 5,604,867 | 2/1997 | Harwood | 395/200.13 |

OTHER PUBLICATIONS

"Multimedia network file servers: Multi-channel delay sensitive data retrieval." J. Gemmell, *Proc. of ACM Multimedia*, pp. 243–250, 1993.

"Grouped sweeping scheduling DASD-based multimedia storage management," P.S. Yu, M.S. Chen, and D. Kandlur, *Multimedia Systems*, pp. 99–109, 1993.

"Principles of delay-sensitive multimedia data storage and retrieval," J. Gemmell and S. Christodoulakis, *ACM Trans. on Information Systems*, vol. 10, No. 1, pp. 51–90, 1992.

"Designing file systems for digital video audio," P.V. Rangan and H.M. Vin, *Proc. of ACM Symposium on Operating Systems Principles*, pp. 69–79, 1991.

"Disk scheduling in a multimedia I/O system," A.L.N. Reddy and J. Wyllie, *Proc. of ACM Multimedia*, pp. 225–233, 1993.

"Efficient placement of audio data on optical disks for real-time applications," C. Yu, et al., *Communications of the ACM*, vol. 32, No. 7, pp. 862–871, 1989.

"Maximizing buffer and disk utilizations for news on-demand," Ng and Yang, *Proc of the 20th VLDB Conference*, pp. 451–462, 1994.

*Primary Examiner*—Eric Coleman
*Attorney, Agent, or Firm*—Richard M. Ludwin; George E. Clark; Jenkens & Gilchrist

[57] ABSTRACT

A system and method of using spare disk bandwidth and buffer capacity maximizes the system throughput of a multimedia server. An important issue is determining a criterion for selecting a data stream for which the additional disk bandwidth should be used. Minimization of buffer consumption is selected as the criterion to select an appropriate media stream to use the spare system resources. Buffer consumption measures not only the amount of buffer but also the amount of time the space is occupied (i.e., the space-time product). Even though both currently active streams and waiting streams can be chosen to adjust the rate of retrieval, it is generally more effective for the active streams. A system and method, for improving data throughput of a multimedia information retrieval system by adjusting a rate of retrieval of one or more data streams, includes means for determining a length of a server service cycle; means for determining a set containing one or more active streams to be serviced concurrently in a cycle by the information retrieval system; means for determining a minimum amount of data retrieval in a cycle for each active stream, where the minimum equals an amount required for continuous playback in a cycle; and means for selecting one or more streams to increase retrieval amount in the cycle.

12 Claims, 3 Drawing Sheets

MULTIMEDIA SERVER SYSTEM HAVING RATE ADJUSTABLE DATA RETRIEVAL BASED ON BUFFER CAPACITY

BACKGROUND OF THE INVENTION

1. Field of the Invention

The present invention relates to information handling systems, and more particularly to information handling systems including a server for retrieving data from a database wherein retrieval rates of data streams are adjusted to maximize system throughput.

2. Prior Art

With the fast advances in network and computer technologies, all kinds of multimedia information, including video, audio, image and text, are being made available in digital form. For example, one can use a Web browser to easily access a vast amount of multimedia information around the globe through the ubiquitous World Wide Web on the Internet. Many projects are currently being established to explore the potential of electronic commerce, such as news on demand, electronic catalogs, electronic shopping, and video on demand. For an information/database provider in this information age, it is vitally important to provide effective multimedia support.

To support multimedia data, especially video and audio, an information/database server needs to deal with several difficult issues. Firstly, video and audio data are delay-sensitive. Namely, once the playback of a stream begins, the server must guarantee that enough resources are allocated so that it is played back continuously and it meets the real-time requirement. Secondly, video and audio data (even in a compressed form) require large amounts of system resources, primarily storage and bandwidth both in disk retrieval and in network transmission. Thirdly, a multimedia object may contain multiple components with very different playback rates, such as video, audio and text. The server must ensure that these multiple components are synchronized during playback.

For performance reasons, multiple multimedia streams are usually serviced simultaneously in a cyclic fashion. During each service cycle, data from each stream are retrieved from disk into the buffer for continuous playback. An admission control technique is used to ensure that, once a stream is admitted, there be enough data in the buffer for the continuous playback of all active streams. Due to non-uniform playback rates and stream lengths and asynchronous arrivals of queries, there tend to be some spare disk bandwidth and buffer space left unused in each service cycle. Such spare disk bandwidth can be used to increase media retrievals, making it possible to finish the retrievals of a stream sooner or to reduce the subsequent retrieval rate. This early completion of retrieval or reduction in retrieval rate makes disk bandwidth available to admit a new request, reducing the average wait time and improving the system throughput. For example, it is very useful for news-on-demand multimedia applications, where the lengths of queries are usually not very long (e.g., less than 5 minutes) and the arrival pattern tends to be in bursts.

There are existing studies focused on the storage and retrieval aspects of video and audio data, such as those presented in "Multimedia network file servers: Multichannel delay sensitive data retrieval," by J. Gemmell, in Proc. of ACM Multimedia, pp. 243–250, 1993; "Grouped sweeping scheduling for DASD-based multimedia storage management," by P. S. Yu, M.-S Chen and D. Kandlur, in Multimedia Systems, pp. 99–109, 1993; "Principles of delay-sensitive multimedia data storage and retrieval," by J. Gemmell and S. Christodoulakis, in ACM Trans. on Information Systems, vol. 10, no. 1, pp. 51–90, 1992; "Designing file systems for digital video and audio," by P. V. Rangan and H. M. Vin, in Proc. of ACM Symposium on Operating Systems Principles, pp. 69–79, 1991; "Disk Scheduling in a multimedia I/O systems," by A. L. N. Reddy and J. Wyllie, in Proc. of ACM Multimedia, pp. 225–233, 1993; and "Efficient placement of audio data on optical disks for real-time applications," by C. Yu et al., in Communications of the ACM, vol. 32, no. 7, pp. 862–871, 1989. These studies generally were concerned with intelligent disk scheduling, or data allocation and storage of multimedia data.

The present invention focuses on the issue of adjusting the rate of retrievals of media streams to maximize system throughput. There are alternatives to the use of spare disk bandwidth such as, prefetching a waiting request or increasing the retrieval rate of an active stream. After prefetching, the requirement for disk reading rate for the stream can be reduced since there are less data left to be retrieved. In "Maximizing buffer and disk utilizations for news on-demand," Proc. of the 20th VLDB Conference, pp. 451–462, 1994, Ng and Yang proposed the use of prefetching a waiting request to maximize disk utilization so as to improve system throughput. The spare disk bandwidth is only used for prefetching waiting streams. However, since prefetched data tend to occupy buffer space for a long period of time, prefetching is in general less effective in using buffer or maximizing system throughput. On the other hand, additionally retrieved data of an active stream that is near its completion occupy buffer space for a shorter period of time, and hence are more effective in using buffer and maximizing system throughput.

SUMMARY OF THE INVENTION

Therefore, it is an object of the present invention to adjust the rate of retrievals of media streams in each service cycle to utilize any spare disk bandwidth and buffer space so as to maximize the system throughput of a multimedia server.

In accordance with an embodiment of the present invention a system and method of using spare disk bandwidth and buffer capacity maximizes the system throughput of a multimedia server. An important issue is what criterion should be used to select a candidate data stream for which the additional disk bandwidth should be used. Minimization of buffer consumption is selected as the criterion to select an appropriate media stream to use the spare system resources. Buffer consumption measures not only the amount of buffer but also the amount of time the space is occupied (i.e., the space-time product). Even though both currently active streams and waiting streams can be chosen to adjust the rate of retrieval, it is generally more effective for the active streams. In describing a preferred embodiment of the invention, a technique for selecting among the active streams to use the spare system resources is employed.

Based on buffer consumption, a rate-adjustable retrieval of an active stream is thus presented to maximize the system throughput using spare disk bandwidth and buffer capacity. During each service cycle, spare disk bandwidth is used to increase the retrieval of active streams. The retrieval rate of the chosen stream thus becomes non-uniform from cycle to cycle. It behaves as if the retrieval rate were adjustable, and thus it is called rate-adjustable retrieval.

BRIEF DESCRIPTION OF THE DRAWINGS

Like reference numerals appearing in more than one drawing depict like elements.

DETAILED DESCRIPTION OF A PREFERRED EMBODIMENT

Figure 1:
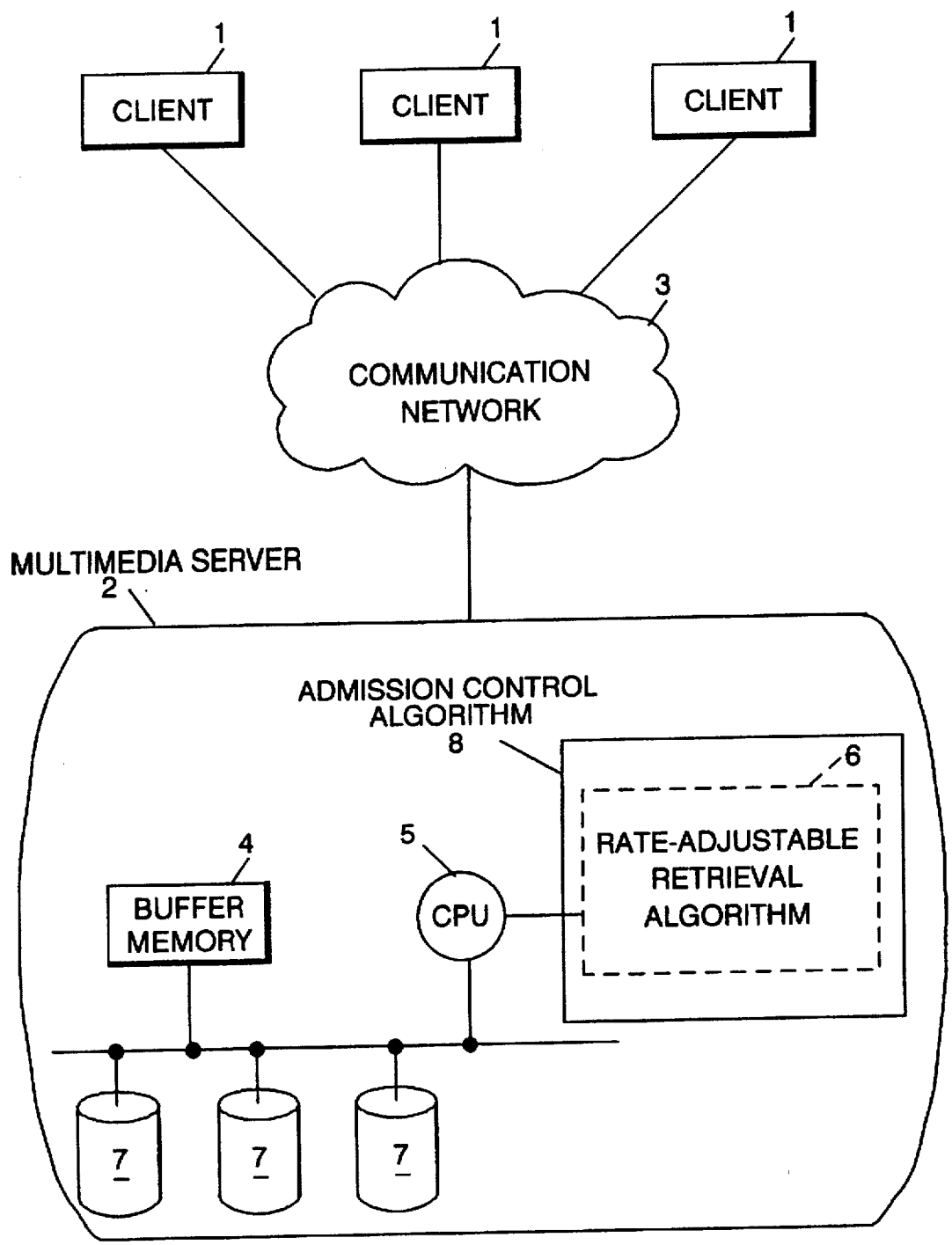
FIG. 1 is a block diagram of a multimedia system embodying the present invention.

Referring now to FIG. 1 a news-on-demand multimedia system according to a preferred embodiment of the present invention will be described. In the following description, it is assumed that in a news-on-demand multimedia system client stations 1 make requests to a server 2 via a communication network 3. The multimedia data are stored on disks 7. The multimedia server 2 includes buffer memory 4 for ensuring continuous display of multiple multimedia streams. The multimedia server 2 also includes a processor 5 (CPU) which executes tasks under control of an admission control technique 8. The multimedia server 2 can be embodied using any processor of adequate performance for the number of media streams to be continuously supported. For example, a small capacity multimedia server could be embodied using an IBM RS/6000 system while a large capacity server could be embodied using an IBM ES/9000 system. The communication network 3 can be an Asynchronous Transmission Mode (ATM) network.

Figure 2:
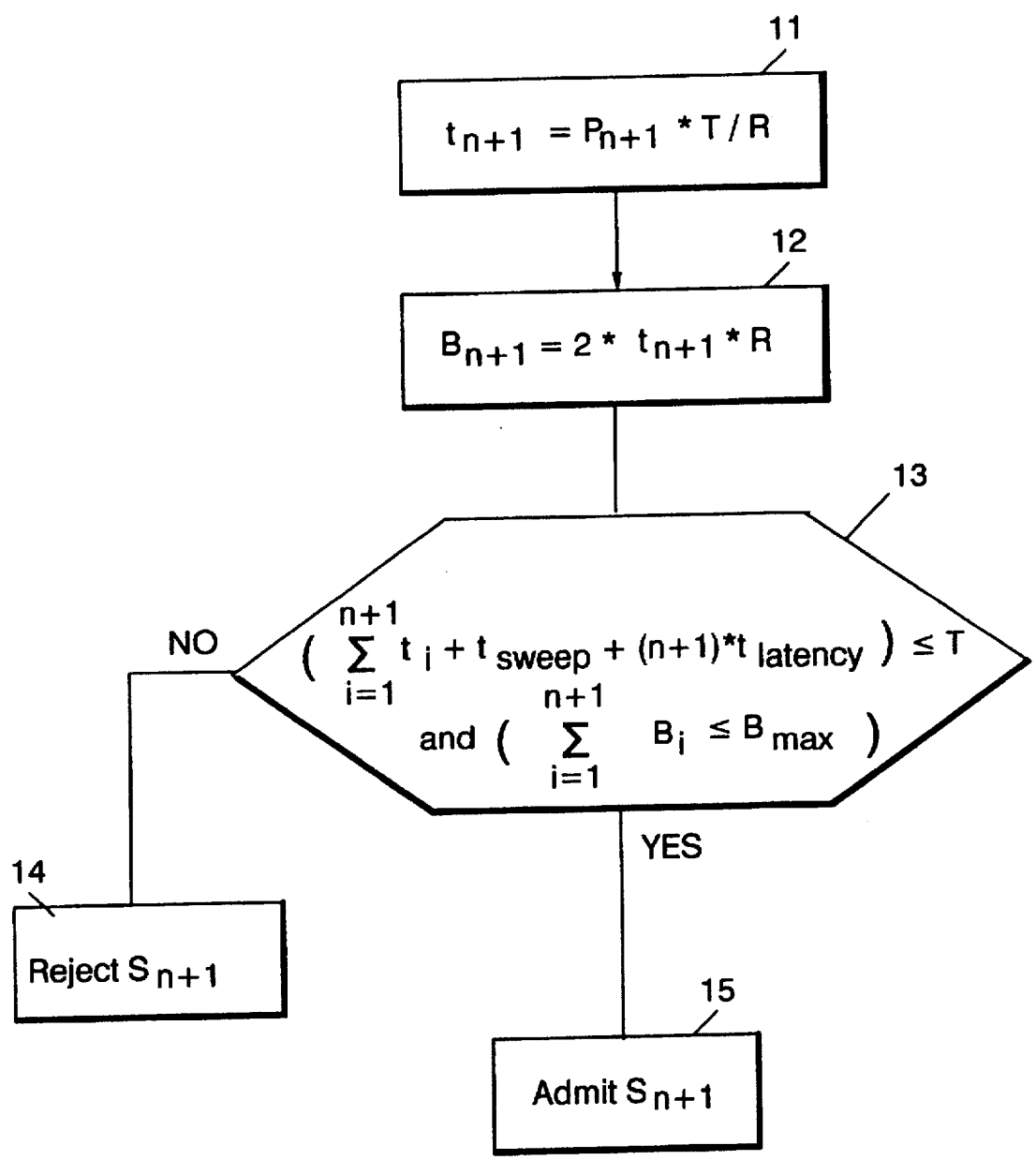
FIG. 2 is a flow diagram of an admission control technique in accordance with the present invention.

An important function supporting rate adjustable retrieval in accordance with the present invention is admission control. FIG. 2 is a flow diagram for such an admission control technique.

Assume that there are n multimedia streams on the network 3 that are currently active and being displayed. When stream $S_{n+1}$ is requested, it must be determined whether or not it can be admitted on the network 3. Let the playback rate of stream $S_i$ be $p_i$ and the amount of time retrieving $S_i$ in each service cycle be $t_i$. Assume that the service cycle time T is fixed and the maximum disk reading rate is R. The admission control technique first determines $t_{n+1}$ as a function of p, T and R as shown in step 11 of FIG. 2. It is based on the observation that the amount of data retrieved in a service cycle $R * t_{n+1}$ is equal to the amount of data being played back in a cycle $T*p_{n+1}$. Next, it determines the buffer requirement for stream $S_{n+1}$ as in step 12 of FIG. 2. Here double buffering is assumed to accommodate an elevator-type of sweeping disk arm scheduling so that the total disk seek time will be minimized. Assume the one-way sweeping time is $t_{sweep}$ and the average rotational latency for reading a stream is $t_{latency}$. To test if stream $S_{n+1}$ can be admitted, two conditions must be true:

$$\left( \sum_{i=1}^{N+1} t_i + t_{sweep} + (n+1) * t_{latency} \right) \leq T$$

and $$\sum_{i=1}^{n+1} B_i \leq B_{max},$$

where $B_{max}$ is the maximum buffer space available (as in step 13 of FIG. 2). If both conditions are met, then stream $S_{n+1}$ can be admitted (step 15); otherwise, it cannot be admitted (step 14).

The service cycle time T can be computed as follows. Assume that the total switching time between retrievals of streams in a service cycle is s. If there are n active streams currently being played back, then $s = t_{sweep} + n * t_{latency}$ using an elevator-type of sweeping disk scheduling. Disk utilization in a service cycle p can be calculated as follows:

$$\rho = \frac{\sum_{i=1}^{n} t_i + s}{T}.$$

If $t_i * R = T * p_i$, namely, the amount of data retrieved equal the amount of data played back during a service cycle, then T can be computed as follows:

$$T = \frac{s * R}{R * \rho - \sum_{i=1}^{n} p_i}$$

As an example, with enough buffer space, a multimedia server is designed to service 4 simultaneous video streams at 80% disk utilization level. Each video stream has a playback rate of 240K bytes/sec. Assume that R is 2000K bytes/sec, $t_{sweep}$ is 32 milli seconds and $t_{latency}$ is 8.5 milliseconds. The service cycle time T is computed as follows:

$$T = \frac{(0.032 + 0.0085 * 4) * 2000K}{2000K * 0.8 - 240K * 4} = 0.206.$$

If $B_{max}$=500K bytes, and streams $S_1, \ldots, S_4$ with $p_1, \ldots, p_4$=240K bytes/sec are currently active, then we can determine if another video stream $S_5$ with $p_5$=240K bytes/sec can be admitted into the service cycle. From FIG. 2, $t_5 = 240K * 0.206/2000K = 0.0247$ sec, and $B_5 = 2 * 0.0247 * 2000K = 98.8K$ bytes. Since $(0.0247+0.0247*4+0.032+0.0085*5)=0.198$ (<T) and 98.8K*5=494K (<$B_{max}$), stream $S_5$ can be admitted into the service cycle. After $S_5$ is admitted, however, it cannot admit another stream $S_6$ with $p_6$=240K bytes/sec since neither disk bandwidth nor buffer space is sufficient to continuously display $S_6$. Thus, $S_6$ will have to stay in the waiting queue.

For a given disk bandwidth and buffer space, there tends to be spare disk bandwidth in each service cycle that cannot be used to add a new stream and thus remains wasted. If there are available buffer space, such unused disk bandwidth can be used to increase the retrievals of active streams, resulting in earlier completion of retrievals and making more disk bandwidth available sooner for the waiting streams. As a result, the system throughput can be improved. Note that the viewer completion time of a stream $S_i$ does not change even if it is chosen to increase retrievals because $p_i$ is fixed. However, the first waiting stream can be started earlier, resulting in less wait time.

Following the above example, when 5 streams are currently being serviced, the disk is not fully utilized. In each service cycle there is still (0.206−0.198)=0.008 sec when the disk is idling. We can use this 0.008 sec to retrieve an additional 0.008*2000K=16K bytes of data in a service cycle, provided that there is 16K bytes spare buffer space available. In Example 1, $B_{max}$=500K. So, after admitting 5 streams, the available free buffer is only 6K bytes and is not sufficient for an additional retrieval of 0.008 secs. However, if $B_{max}$ is bigger, say 1000K bytes, then we can select an active stream to increase the retrieval of 16K bytes and thus complete its retrievals sooner. Once completed, a new stream can be admitted because of the disk bandwidth made available sooner, thus improving the system throughput.

To maximize the system throughput by adjusting the rate of retrievals of active streams with the spare disk bandwidth, the buffer consumption due to increased retrievals must be minimized. Namely, the space time product incurred due to such extra retrievals must be minimized. Note that the available disk bandwidth and buffer space may change over time. For example, the available disk bandwidth and buffer space may change due to the arrival of a new stream that gets started; the server may run out of buffer space after a few additional retrievals. If a VCR-type function is supported, such as pause/resume, then the next stream completion time may be uncertain. This can also affect the available disk bandwidth. As a result, it is generally not feasible to calculate the exact additional buffer consumption at the moment that a candidate stream is to be determined. Thus, an approximation is needed.

A simple approximation of buffer consumption by additionally retrieved data is the minimal remaining area computed as follows:

$$0.5 * p_i * r_i * r_i$$

This criterion simply computes the buffer consumption of the remaining data, assuming that all the remaining data are instantaneously fetched into the buffer and gradually played back in time $r_i$. Here, $r_i$ is the remaining playing time of stream $S_i$.

Figure 3:
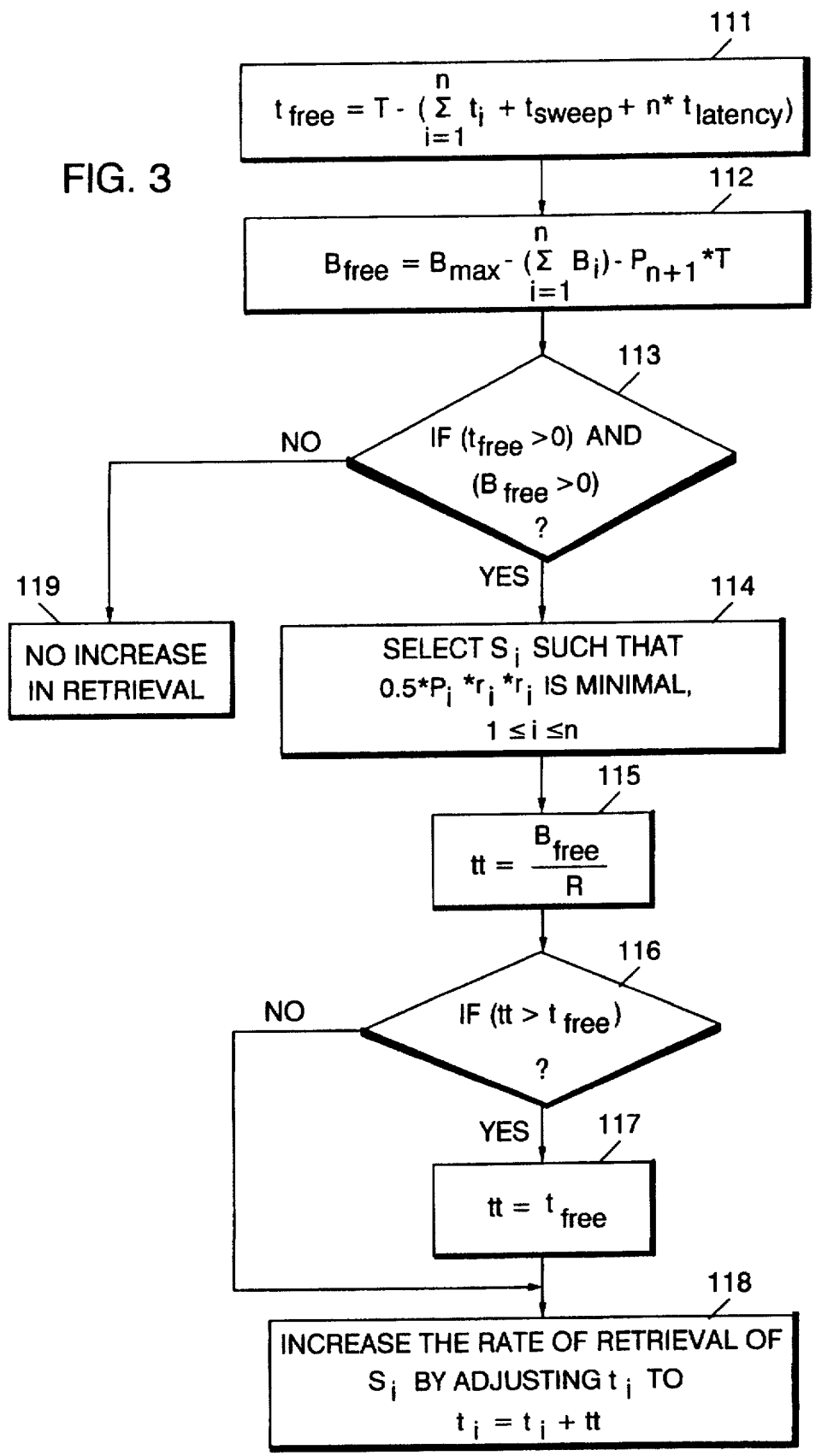
FIG. 3 is a flow diagram of a rate-adjustable retrieval method in accordance with the present invention.

Referring now to FIG. 3 a flow diagram of rate-adjustable retrieval method according to the present invention will be described. CPU 5 selects an active stream to adjust its rate of data retrieval. Based on the admission control technique described above with reference to FIG. 2, there are n streams that are currently active and stream $S_{n+1}$ is the next stream that is waiting in the queue. In other words, stream $S_{n+1}$ cannot be admitted by the admission control technique described above with reference to FIG. 2. The available disk bandwidth in terms of available retrieval time in the current cycle $t_{free}$ is first calculated in step 111. It is the difference between the total service cycle time T and the total retrieval and switching times for all the n active streams. Next, the available buffer space $B_{free}$ for additional retrievals is computed at step 112. In step 112, $$B_{free} = B_{max} - (\Sigma = I^n B_i) - p_{n+1} * T.$$

Here a free space of $P_{n+1}*T$ is not used by the additional retrievals and is reserved for the use of the first waiting stream. This would prevent the additionally retrieved data from blocking the admission of the first waiting request when another active stream completes the playback. After computing $t_{free}$ and $B_{free}$, if any of them is not positive, then no increase in retrieval is performed as in 119. If both of them are positive, then a stream $S_i$ is selected from all the n active streams such that $0.5*p_i*r_i*r_i$ is minimal for $1 \leq i \leq n$ as in 114. If $tt = B_{free}/R$ (step 115), tt is the amount of time it takes to retrieve $B_{free}$ of data. If $tt > t_{free}$ (step 116), then tt is set to be $t_{free}$ (step 117). Finally, the retrieval time for stream $S_i$ is adjusted by an amount of tt in the coming cycle in step 118.

Note that the selection criterion presented in step 114 of FIG. 3 is only one approximation of buffer consumption by the increased retrievals. Alternatively, one can try to compute the additional area caused by the additional retrievals. Assume that sufficient buffer capacity is available to support the increased retrievals until completion, the available spare disk bandwidth is a, and the early completion time due to increased retrievals is $r'_i$, then $$r_i = \frac{p_i * r_i}{a + p_i},$$

where $p_i * r_i$ is the remaining data to be fetched, and $a+p_i$ is the adjusted retrieval rate. The additional area can thus be computed as follows:

$$0.5 * p_i * (r_i - r'_i) * r_i$$

Here the additional data retrieved during the accelerated retrieving period $r'_i$ is $p_i*(r_i - r'_i)$. Therefore, the increased buffer consumption can be derived by $0.5*r_i*p_i*(r_i - r'_i)$.

Also note that after certain data have been additionally retrieved into the buffer, there is a possibility to lower its retrieval rate in a cycle before all the data have been completely read into the buffer. Hence, the disk bandwidth requirement of this stream can be reduced. Such reduction in disk bandwidth may be used to admit a new request. As a result, the system throughput can also be improved.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

What is claimed is:

1. A method for improving data throughput of a multimedia information retrieval system by adjusting a rate of retrieval of one or more data streams, comprising the steps of
   determining a length of a server service cycle;
   determining a set containing one or more active streams to be serviced concurrently in a cycle by said information retrieval system;
   determining a minimum amount of data retrieval in a cycle for each active stream, where said minimum equals an amount required for continuous playback in a cycle; and selecting one or more streams to increase retrieval amount in the cycle.

2. The method of claim 1, further comprising the step of:
   determining an amount of increased data retrieval based on available buffer space.

3. The method of claim 1, further comprising the step of:
   determining an amount of increased data retrieval based on spare disk bandwidth.

4. The method of claim 1 wherein buffer activity is used as a selection criterion for said selecting step.

5. The method of claim 1 further comprising the step of:
   reducing a retrieval rate of a stream to allow a waiting request to be admitted.

6. The method of claim 1 wherein said one or more streams are selected from either said set of active streams or a set of waiting streams.

7. A system, for improving data throughput of a multimedia information retrieval system by adjusting a rate of retrieval of one or more data streams, comprising:
   means for determining a length of a server service cycle;
   means for determining a set containing one or more active streams to be serviced concurrently in a cycle by said information retrieval system;
   means for determining a minimum amount of data retrieval in a cycle for each active stream, where said minimum equals an amount required for continuous playback in a cycle; and
   means for selecting one or more streams to increase retrieval amount in the cycle.

8. The system of claim 7, further comprising:
   means for determining an amount of increased data retrieval based on available buffer space.

9. The system of claim 7, further comprising:
   means for determining an amount of increased data retrieval based on spare disk bandwidth.

10. The system of claim 7 wherein buffer activity is used as a selection criterion for said selecting means.

11. The system of claim 7 further comprising:
means for reducing a retrieval rate of a stream to allow a waiting request to be admitted.

12. The system of claim 7 wherein said one or more streams are selected from either said set of active streams or a set of waiting streams.

* * * * *